Dec. 4, 1962 D. R. BRANUM ETAL 3,067,344
PULSE STRETCHER EMPLOYING CAPACITOR CHARGED THROUGH
INTEGRATING CIRCUIT AND DISCHARGED BY
DELAYED TRANSISTOR CLAMP
Filed June 8, 1961
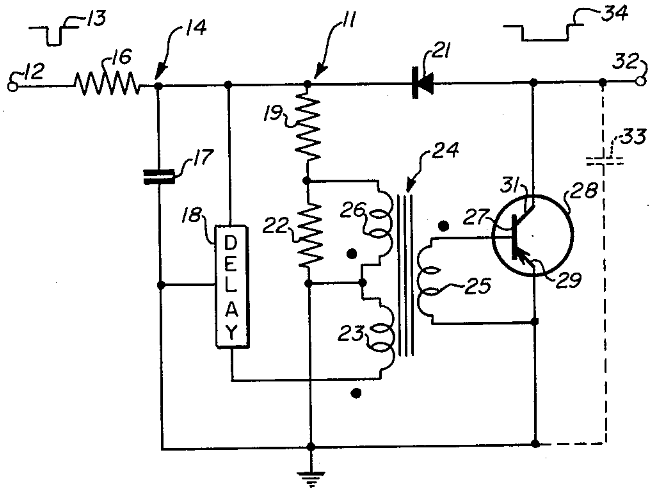
INVENTORS
WILLIAM F. CUMMINS
BY DAVID R. BRANUM
Roland A. Anderson
ATTORNEY 3,067,344
Patented Dec. 4, 1962

3,067,344

PULSE STRETCHER EMPLOYING CAPACITOR CHARGED THROUGH INTEGRATING CIRCUIT AND DISCHARGED BY DELAYED TRANSISTOR CLAMP

David R. Branum and William F. Cummins, Livermore, Calif., assignors to the United States of America as represented by the United States Atomic Energy Commission Filed June 8, 1961, Ser. No. 115,828
6 Claims. (Cl. 307—88.5)

The present invention relates, in general, to pulse circuits and, more particularly, to a short pulse stretching circuit capable of stretching a short pulse to enable same to be displayed on a relatively slow-sweeping oscilloscope.

In the field of nuclear research, particle counters serve as an important diagnostic tool. One type of particle counter basically comprises a plastic scintillator and photomultiplier tube combination, wherein such photomultiplier tube drives a pulse along a coaxial output cable. The photomultiplier tube does not lengthen the light pulse received therein, but, instead, only generates electrical pulses of similar duration times. Such pulses have rise times of the order of 6 to 8 nanoseconds and decay times of 40 nanosecond. In order to display such short pulse on an oscilloscope which sweeps at a relatively slow speed, it is necessary to stretch the pulses for approximately one microsecond.

A conventional method of streching a pulse entails the use of a pulse-forming network, employing a cathode follower and a delay line. However, such method presents several shortcomings. First, since a delay line type of pulse stretcher requires a cathode follower input and output for impedance matching, a power surce is required. Second, delay lines are frequency-limited in that they all have distributed capacitance, inductance, and resistance, and therefore all have attenuation losses for each range of frequencies which may be employed. A pulse stretcher using such delay lines is limited to short stretched pulse lengths. If conventional delay line, e.g., RG–8/U, were utilized to stretch the pulses to a one microsecond width, approximately 325 feet of such cable would be required, and thereby presents a severe storage and packaging problem. In addition, most delay lines attenuate the signal for a one microsecond pulse width to the extent that an auxiliary amplifier would be necessary to bring the stretched signal up to a useable level. Third, in the delay line pulse stretcher, the measured signal passes through the delay line itself, and thereby is affected by all the line losses.

To overcome the foregoing difficulties, the present invention provides another type of pulse stretching circuit, wherein the duration of the pulse is increased by charging a capacitor through a diode, and thereafter discharging the capacitor at such time as is desired. Although the present pulse stretcher employs a delay line, the input pulse signal passes through a diode only, and thereby incurs only the losses of the diode; such losses arising from the diode's low forward resistance and very low reverse leakage current. A portion of the input pulse, or trigger pulse, alone passes through the delay line, and is thus the only signal affected by the delay line attenuation losses. Furthermore, the invention, unlike many conventional pulse stretchers, uses no exterior power source, and is capable of increasing a pulse duration while simultaneously introducing same into a high-impedance circuit. The circuit employed is simple in orperation and in construction, thereby resulting in a practical and inexpensive method of pulse stretching.

Therefore, it is an object of the present invention to provide an improved circuit capable of stretching a short pulse.

It is another object of the present invention to provide a pulse stretcher capable of producing a one microsecond pulse width with a minimum of attenuation losses for each range of frequencies which may be employed.

It is still another object of the present invention to provide a pulse stretcher employing a delay line, wherein the signal to be stretched does not pass through the delay line.

It is yet another object of the present invention to provide a pulse stretcher circuit, wherein no exterior power source is necessary.

It is a further object of the present invention to provide a pulse stretcher which is simple in operation, and practical and inexpensive in construction.

Other objects and advantages will be apparent in the following description and claims, considered together with the accompanying drawings, wherein the single figure shows a schematic diagram of a preferred embodiment of the present invention.

As illustrated in the drawing, the present invention provides a pulse stretcher 11 which is fed by an input terminal 12 into which is introduced a short pulse 13. The pulse is delivered, for example, by the output line from a photomultiplier tube employed with a scintillator to count nuclear particles. An RC intergrator network 14 is connected to the input terminal 12 and comprises, more particularly, a resistor 16 conhected at one end to input terminal 12 and at the other end to ground through a capacitor 17. The junction of resistor 16 and capacitor 17 is commonly connected, in turn, to the center conductor of a delay line 18, a resistor 19, and the negative side of a diode 21. A resistor 22 is coupled from resistor 19 to ground, the combination of these two resistors 19 and 22 forming a voltage divider network. The other end of the conductor of daley line 18, is connected to one end of a main coil 23 of the primary of a coupling transformer 24. The junction between resistors 19 and 22 is connected to one end of a second, or bucking, coil 26 in the primary of the transformer 24. The other ends of coil 23 and coil 26 in the primary of such transformer are commonly connected to ground. Such coils 23 and 26 are wound to be opposite in polarity, as is shown by the polarity dots in the figure. One end of a secondary coil 25 of transformer 24 is connected to a base electrode 27 of a transistor 28, while the other end of the secondary coil 25 is coupled to an emitter electrode 29 of the transistor 28. The emitter 29 is grounded, as in the case of a conventional grounded emitter transistor connection. The collector electrode 31 of transistor 28 is connected to the positive side of the diode 21 and, also, through an output termnial 32 to a stretching capacitance, herein shown as capacitor 33. In actuality, capacitor 33 is the load, as seen by the pulse stretcher circuitry, and is of such magnitude as to provide the amount of pulse stretching desired. The capacitor 33 may hence advantageously comprise the input capacitance of an oscilloscope (not shown) upon which a stretched pulse 34 appearing at output terminal 32 is displayed.

As regards the operation of the above circuit, the short input pulse 13 to be lengthened is introduced by suitable circuitry to the input terminal 12. Such input pulse 13 is then fed to the diode 21, resulting in the charging of the capacitor 33, which as indicated previously, is preferably the input capacitance of an oscilloscope connected to terminal 32 for purposes of displaying the resultant stretched outside pulse. However, the recovery time of the diode 21 is excessive, thereby producing a spike on the leading edge of the stretched output pulse 34. The RC integrator network 14 is therefore placed between the input terminal 12 and the diode 21 to produce a rise time of the input pulse 13, comparable to the recovery time of the diode 21, thus eliminating most of the spike, and producing a flat-topped, lengthened pulse 34.

The trigger portion of the input pulse 13 is delayed the desired period of time, as regulated by the length of delay line 18, and subsequent to the delay time determined by the line, the pulse trigger portion is fed from the line 18 into the main coil 23 of the transformer 24, giving rise to a signal in the secondary coil 25 of such transformer. Since the transformer is coupled to the base 27 of transistor 28, which is normally held at cutoff by a zero or ground bias on the base thereof, such signal switches on the transistor. The transistor thereupon conducts to act as a short to ground for the stretched pulse 34, as seen across the stretching capacitor 33, and thereby returns same to zero. This action clips output pulse 34 to form a complete pulse of the desired length.

The infiltration of any extraneous initial pulse through the distributed capacitance of the delay line 18 is sufficiently strong in magnitude to cause transistor 28 to conduct, thereby prematurely returning the pulse being stretched to zero. Since such action would make the circuit highly unreliable, a portion of the input pulse 13 is fed to the primary bucking coil 26 in the transformer 24 by means of the voltage divider network, comprised of resistors 19 and 22. The polarity of such bucking coil 26 is opposite that of the delay line primary main coil 23, thus generating a pulse in the bucking coil 26 which cancels the undesirable extraneous initial pulse of previous mention in the main coil 23.

As an example of specific parameters which may be employed in the circuit of the present invention, consider the case where an input pulse is fed through a 9.4 nanosecond RC integrator, charging a 47 micromicrofarad input capacitance of an oscilloscope through a G111A diode. This diode was chosen as it has the best recovery characteristics of the locally available diodes. The stretched pulse is returned to zero by delaying the input pulse one microsecond with a length of HH2500 line and then transformer coupling it into the base of a 2N317A transistor. The latter is adequately cut off with a zero base bias and was chosen principally for its speed and availability. The maximum stretched pulse level is of the order of 6 volts, which limitation is established by the transistor's maximum collector-base voltage. The maximum pulse level, therefore, may be raised if desired by employing a transistor of higher collector-base voltage. The minimum pulse level is determined by noise from delay line reflections and various distributed reactances. The lower pulse level in the specific embodiment is of the order of 30 to 40 millivolts. A portion of the input pulse as derived from a 500 ohm-30 ohm divider network is used to cancel the initial pulse, as previously described. The present circuit produces a flat-topped, stretched pulse of 0.2 $\mu$sec./cm., 1 volt/cm. on the oscilloscope; or a 1 $\mu$sec. pulse of 1 volt magnitude. It is to be noted that there are many other diodes and transistors which would serve equally well in the circuit.

While the invention has been disclosed herein with respect to a single preferred embodiment, it will be apparent that numerous variations and modifications may be made within the spirit and scope of the invention, and thus it is not intended to limit the invention, except by the terms of the following claims.

What is claimed is:

1. A short pulse stretcher for forming a stretched pulse comprising a diode, short pulse input means connected to one side of said diode to apply a short pulse thereto, a stretching capacitance load connected to the other side of said diode, RC integrator means coupled between said input means and said diode to produce a rise time in said short pulse comparable to the recovery time of said diode, a delay line coupled to said input means for controlling the charging of said stretching capacitance load by said input pulse for a predetermined time interval, and switching means coupled between said delay line and said capacitance load to discharge the latter at the end of said time interval and thereby form the stretched pulse thereacross.

2. The combination according to claim 1 wherein said delay line is connected in parallel across said diode with the former in receiving relation to a trigger portion of said input pulse to delay same said predetermined time interval, said delay line coupled in triggering relation to said switching means with the latter coupled to said capacitance load to form a conduction path to ground upon triggering and thus clip said stretched pulse appearing across said capacitance load.

3. A short pulse stretcher for producing stretched pulses comprising a diode, short pulse input means connected to the negative side of said diode to apply a short pulse thereto, a stretching capacitance load connected to the positive side of said diode, RC integrator means coupled between said input means and said diode to produce a rise time in said short pulse comparable to the recovery time of said diode, a delay line connected to the juncture of said integrator means and said diode, transformer coupling means connected at its input to the other end of said delay line, and switching means connected between the output of said transformer coupling means and the juncture of said diode and capacitance load to form a conduction path to ground.

4. The combination according to claim 3 wherein said transformer coupling means comprises a primary coil, a secondary coil, a bucking coil wound with the primary coil and in opposite polarity relation therewith, a voltage divider network connected between said input means and said bucking coil to pass to the latter extraneous pulses seen by said divider network, said secondary coil being coupled in triggering relation to said switching means.

5. The combination according to claim 4 wherein said switching means comprises a transistor having a grounded emitter, a collector connected to the positive side of said diode, a base connected to the secondary of said transformer coupling means, said transistor being held at cutoff by the ground bias on the base thereof and rendered conductive in response to pulses in said secondary coil to provide a short to ground.

6. A short pulse stretching circuit comprising an RC integrator network, a delay line connected to the output of said integrator network, a diode connected to the output of said integrator network, a transistor including an emitter, collector and base, wherein said collector is coupled to the positive side of said diode and wherein said emitter is connected to ground, transformer means including a primary coil and a secondary coil for transformer coupling the output of said delay line into the base of said transistor, bucking means including a voltage divider and a bucking winding in the primary coil of said transformer, said bucking winding being wound to provide a polarity opposite that of said primary coil, input terminal means to apply short pulses to the input of said RC integrator network, and a stretching capacitance load coupled between the positive side of said diode and ground.

No references cited.